United States Patent [19]

Johnson et al.

[11] 3,860,477

[45] Jan. 14, 1975

[54] METHOD OF BONDING USING NITROCELLULOSE CONTAINING ADHESIVE COMPOSITIONS

[75] Inventors: Craig E. Johnson, Indian Head; Larry D. Henderson, Bryans Rd., both of Md.

[73] Assignee: The United States of America as represented by the Secretary of the Navy, Washington, D.C.

[22] Filed: June 13, 1973

[21] Appl. No.: 369,626

Related U.S. Application Data

[62] Division of Ser. No. 265,934, June 23, 1972, Pat. No. 3,758,325.

[52] U.S. Cl. ............ 156/331, 106/15 AF, 149/100, 161/220
[51] Int. Cl. ....... C09j 5/02, C06b 5/00, B32b 15/08
[58] Field of Search ....... 106/15 AF, 178, 180, 195; 149/94, 95, 96, 97, 98, 99, 100; 156/331; 161/220, 265

[56] References Cited
UNITED STATES PATENTS
2,003,914   6/1935   Whitworth ............................ 149/98

OTHER PUBLICATIONS

Chemical Abstracts, 4th Decennial Index, (1937–1946), p. 3543.
Chemical Abstracts, 4th Decennial Index, (1937–1946), p. 7245.
Chemical Abstracts, Vol. 34, column 6075[3].

Primary Examiner—Charles E. Van Horn
Assistant Examiner—Robert A. Dawson
Attorney, Agent, or Firm—R. S. Sciascia; J. A. Cooke; T. E. McDonnell

[57] ABSTRACT

A nitrocellulose containing adhesive composition comprising two components which are mixed together and cured. Component A comprises nitrocellulose, trimethylol ethane trinitrate, $CH_3C(CH_2ONO_2)_3$, and ethyl centralite while component B comprises triethylene glycol dinitrate, ethyl centralite and dibutyltin dilaurate. The invention also includes the method of applying the composition to the system to be used, namely the mixing of the two components together and applying to the surfaces to be adhered before the mixture completely cures.

4 Claims, No Drawings

METHOD OF BONDING USING NITROCELLULOSE CONTAINING ADHESIVE COMPOSITIONS

This is a division of application Ser. No. 265,934 filed on June 23, 1972 and now Pat. No. 3,758,325.

BACKGROUND OF THE INVENTION

In various ordnance devices, such as ammunition and propellant chambers, adhesives had heretofore been used to adhere various parts together. For example, cartridge devices are often glued together by first filling the propellant chamber with propellant granules and then affixing the back portion of the device onto the chamber by means of a conventional glue such as an epoxy resin.

However, these epoxy resins suffer from a disadvantage in that they leave a residue after the propellant is ignited. A residue is left because these epoxy resins, as is true of other conventional glues, are not energetic. In addition, many of the prior art adhesives suffer from the fact that the bonds they form are not elastic since the adhesive does not contain a plasticizer. Furthermore, many present adhesives contain a solvent and this causes degradation of the product as well as cracking of the adhesive bond.

SUMMARY OF THE INVENTION

Accordingly, it is one object of this invention to obtain as energetic adhesive.

It is another object of this invention to provide an adhesive which undergoes clean burning.

It is yet another object of the present invention to obtain an adhesive which burns rapidly.

A further object of this invention is to obtain an adhesive bond which does not crack.

An additional object of the invention is to produce an adhesive which does not undergo a degradation.

It is still another object of the instant invention to formulate a cured adhesive which is flexible.

It is even another object of the instant invention to obtain an adhesive which is strong.

These and other objects are accomplished by providing a two component composition, which, upon admixture, forms an excellent adhesive which must be applied prior to the time it takes for it to be cured. Component A comprises pelletized or plastisol nitrocellulose, trimethylol ethane trinitrate, $CH_3C(CH_2ONO_2)_3$, [hereinafter TMETN] and ethyl centralite [hereinafter EC] while component B comprises dibutyltin dilaurate [hereinafter DBTDL], EC, and triethylene glycol dinitrate [hereinafter TEGDN].

DESCRIPTION OF THE PREFERRED EMBODIMENTS

The adhesive of the instant invention is formed by mixing two separate components, which shall be called Components A and B. While each of the components are stable and may be stored for extended periods, when they are mixed together, they will cure in anywhere from a few minutes to a few days, depending upon various conditions. The curing, in large part, depends upon the amount of TEGDN present in component B. The TEGDN is a plasticizer and the more plasticizer that is present, the quicker the cure and, therefore, the shorter the pot life, or allowable usage life, of the mixture. An additional plasticizer, such as adiponitrile may be present in component B in amounts from 0 to about 10 percent by weight of the composition of component B. Adiponitrile is a more active plasticizer than TEGDN and as a result the pot life of the mixture will decrease at a greater rate with increasing amounts of adiponitrile than it would for increasing amounts of TEGDN. With no adiponitrile present, the cure time at room temperature is about 3 days, while about ten percent adiponitrile will decrease the cure time at room temperature to about 6–8 hours. Cure time may also be decreased by an increase in temperature to a value not to exceed 140°F. With no adiponitrile present in the composition, heating the mixture to 140°F will decrease the cure time to 2 to 4 hours. If 10 percent adiponitrile is present, the cure time at 140°F is a few minutes.

The mixture must be applied during the pot life of the mixture. The mixture can be applied to either a rubber or metal surface, but when applied to a metallic surface, a primer of cellulose acetate in acetone is first applied and the adhesive will bond to this.

Component A comprises, on a weight percent basis, 20–80% of pelletized or plastisol nitrocellulose, 20–80% of TMETN and 0.1 to 2% of EC. A preferred composition contains about 48.5% of plastisol nitrocellulose, 49.87% of TMETN and 1.63% of EC. Component B comprises, on a weight percent basis, from about 0.005% to 0.3% DBTDL, which serves as a catalyst for crosslinking; 0.1 to 2% of EC; which serves as a stabilizer; and a balance of TEGDN. A preferred composition contain 99.74% of TEGDN, 0.25% EC and .01% DBTDL. Component B can also contain, as optional ingredients, up to 10% of adiponitrile (plasticizer); up to 50% of TMETN; up to 3% of fibrous nitrocellulous [as a thickener]; up to 1% of a standard coloring agent; and up to 0.2% of resorcinol, which is used as a stabilizer for any ammonium perchlorate oxidizer system that the adhesive may come in contact with during use. These optional ingredients are added to the composition as a replacement for part of the TEGDN.

Components A and B are to be stored in separate containers. Shortly before they are to be used they are mixed in a ratio of component A to component B between about 3.34:1 to about 2:1. It is desirable, but not necessary, to vacuum degas the mixture prior to use so as to prevent air inclusion in the bond, thus promoting higher shear strength.

The following example will serve to better illustrate the invention. This example is not intended to limit, in any manner, the scope of the instant invention or the claims to follow.

EXAMPLE

Component A is comprised of 48.5% of plastisol nitrocellulose, 49.87% of TMETN and 1.63% of EC. The mixture, which can be formulated in any conventional manner [which is true of component B as well], is prepared as follows.

The ingredients are dried to a moisture content of 0.2 percent or less prior to mixing. The PNC and TMETN are vacuum mixed in the presence of at least 4 percent by weight of heptane. The ingredients can be mixed at any temperature up to 140°F.

Component B comprises 99.74% TEGDN, .25% EC and .01% B DBTDL. The ingredients are dried to a moisture content of 0.2 percent or less prior to mixing.

Mixing is time dependent and agitation throughout the mixing cycle is not necessary. When component B is completely mixed, it will be free-flowing and transparent. Mixing temperature is not to exceed 140°F.

Twenty five parts of component B are mixed with fifty parts (by weight) of component A. The mixture has a pot life of 4–8 hours and a 4 hour cure time at 140°F. Tensile strength exceeds 50 psi.

The mixture can be used to glue together the parts of an ordnance system as well as to glue one type of rocket propellant to another. For, example, it can bond together a single base propellant to a double base propellant, or a double to a double or a single to a single. When the propellant is burned, so is the adhesive as it burns rapidly and cleanly, leaving no residue.

Obviously, numerous modifications and variations of the present invention are possible in light of the above teachings. It is therefore understood that within the scope of the appended claims the invention may be practised otherwise than as specifically described herein.

What is claimed as new and desired to be secured by Letters Patent of the United States is:

1. In a method of gluing together the parts of a cartridge device by means of filling a propellant chamber with a propellant, then placing an adhesive on said chamber in amounts sufficient to adhere an additional piece to said chamber, and then adhering said additional piece to said chamber, the improvement which comprises utilizing, as said adhesive, an adhesive composition which is a mixture of a component A with a component B wherein said component A comprises, on a weight percent basis, 20–80% of trimethylol ethane trinitrate, 0.1 to 2% of ethyl centralite and 20–80 percent of a nitrocellulose compound selected from the group consisting of plastisol nitrocellulose and pelletized nitrocellulose; and said component B comprises, on a weight percent basis, from 0.005 – 0.3 percent of dibutyltin dilaurate, 0.1 – 2 percent of ethyl centralite and a remainder of triethyleneglycol dinitrate; with the proviso that said adhesive composition is applied to said chamber during the pot life of said adhesive composition; and with the further proviso that when said chamber has a metallic surface, a primer to which the adhesive will bond is first applied to the metallic surface.

2. The method of claim 1 wherein said component B also comprises from 0–10 percent of adiponitrite, from 0–30 percent of trimethylol ethane trinitrate, from 0–3 percent of fiberous nitrocellulose, from 0–1 percent of a coloring agent, and from 0–2 percent of resorcinol.

3. The method of claim 1 wherein component A comprises 48.5 percent of plastisol nitrocellulose, 49.98 percent of trimethylol ethane trinitrate and 1.63 percent of ethyl centralite; and wherein component B comprises 0.01 percent of dibutyltin dilaurate, 0.25 percent of ethyl centralite, and 99.74 percent of triethylene glycol dinitrate.

4. The method of claim 1 wherein said primer is cellulose acetate in acetone.

* * * * *